Figure 1:
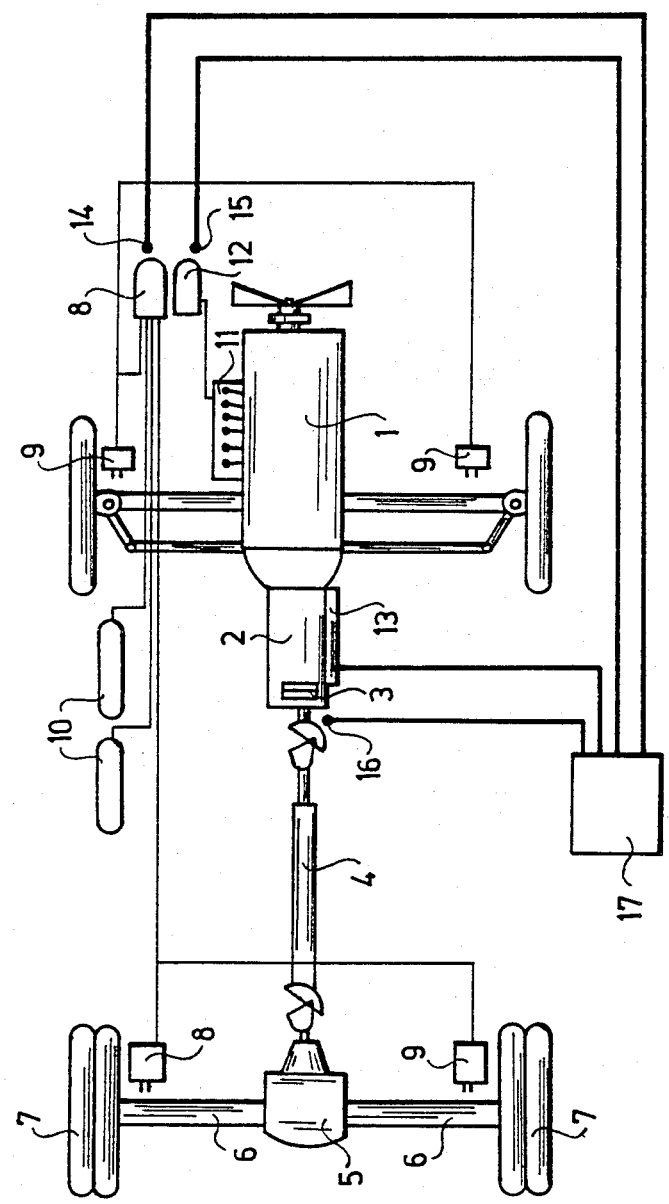

United States Patent [19]

Simonyi et al.

[11] Patent Number: 4,867,288
[45] Date of Patent: Sep. 19, 1989

[54] PROCESS FOR ACTUATING A MOTOR VEHICLE RETARDING BRAKE CONTROLLED BY AN ELECTROHYDRAULIC VALVE SYSTEM

[75] Inventors: Sandor Simonyi, Salgótarján; László Töröcsik, Budapest; István Tóth; György Válóczi, both of Salgótarján, all of Hungary

[73] Assignee: Csepel Autógyár, Szigetszentmiklós, Hungary

[21] Appl. No.: 187,490

[22] Filed: Apr. 28, 1988

[30] Foreign Application Priority Data

May 20, 1987 [HU] Hungary .............................. 2247/87

[51] Int. Cl.⁴ ............................................. B60K 41/20
[52] U.S. Cl. ...................... 192/1.23; 192/1.21; 192/1.51; 192/4 B; 180/179; 364/426.04
[58] Field of Search ................... 192/1.21, 1.23, 1.51, 192/4 B; 180/179; 364/426.04

[56] References Cited

U.S. PATENT DOCUMENTS

| | | | |
|---|---|---|---|
| 2,395,904 | 3/1946 | Oetzel | 192/1.23 |
| 2,538,796 | 1/1951 | Oetzel et al. | 1.92/1.23 |
| 3,033,053 | 5/1962 | Kelley | 192/1.23 |
| 3,108,667 | 10/1963 | Kelley | 192/1.23 |
| 3,407,908 | 10/1968 | Smith | 192/1.51 |
| 3,952,829 | 4/1976 | Gray | 364/426.04 |
| 4,354,467 | 10/1982 | Noddings et al. | 364/426.04 |
| 4,467,428 | 8/1984 | Caldwell | 364/426.04 |
| 4,485,444 | 11/1984 | Maruyama et al. | 364/426.04 |
| 4,677,560 | 6/1987 | Cao et al. | 364/426.04 |
| 4,737,913 | 4/1988 | Blee et al. | 180/179 |

Primary Examiner—Rodney H. Bonck
Assistant Examiner—Andrea Pitts
Attorney, Agent, or Firm—Schweitzer & Cornman

[57] ABSTRACT

The invention relates to a process for the actuation of an hydrodynamic retarder brake for motor vehicles, which is controlled by an electrohydraulic valve system. The rotational velocity of some part of the drive system (or an average of a plurality thereof) is indicated by a continuously generated electrical signal. When the throttle is released, or the brake pedal, having been depressed is then released, the vehicle velocity at that moment is stored as a reference signal in a memory. If the actual velocity thereafter exceeds the stored value, the hydrodynamic retarder is actuated. The momentary velocity of the vehicle is thereafter continuously compared with the stored reference velocity, and the retarder controlled accordingly. Rapidly applied retarder action is realized by controlling the same using PD control.

3 Claims, 3 Drawing Sheets

PROCESS FOR ACTUATING A MOTOR VEHICLE RETARDING BRAKE CONTROLLED BY AN ELECTROHYDRAULIC VALVE SYSTEM

The invention relates to a process, by the aid of which electrohydraulically controlled hydrodynamic slowing-down brakes /retarders/ used in motor vehicles travelling in vehicular traffic can be actuated.

It is a well known fact that permanent braking results in high loads of the brake system. For this reason, in particular in heavy motor vehicles and autobusses hydrodynamic retarders used to be applied for reducing the load of traditional braking systems. With simpler solutions the hydrodynamic retarder operates parallel with the traditional brake, proportionally therewith. However, in course of permanent braking the hydrodynamic retarder relieves only partly the traditional brake.

Situations may occur, so e.g. when travelling on a longer slope, in which the aim is not to stop fully the vehicle, but the task of the brake is to prevent acceleration i.e. to keep speed on a constant level. In these cases the effect of the hydrodynamic brake alone would suffice. However, if it is made independent of the traditional brake, a separate control is to be provided for.

For this purpose several control solutions have been elaborated. Every one of said solution represents a certain level of automatization, in so far as hydrodynamic brake is controlled by some reference-value.

With the solution disclosed in the European Patent EP-0036 753, the number of revolutions of the motor is measured, and the result thus obtained is compared to the previously fed permissible maximum. If said value is exceeded, control automatically switches the hydrodynamic retarder and regulates number of revolutions of the motor to the reference value in all the three gears. In case of necessity control can be disconnected by means of a manual switch.

European Patent EP-0 145 374 describes a solution, wherein the number of revolutions of the motor or velocity of the vehicle is measured and compared to the corresponding reference value, which may be a constant value pre-programmed into the control mechanism or it is set by the driver.

When the reference value is exceeded, a control mechanism switches the hydrodynamic retarder automatically and regulates it to the reference value.

In the French Patent FR-PS 2 424 827 a solution is disclosed, with which the traditional brake system of the motor vehicle is provided with a control mechanism for the prevention of locking. In this case the number of revolutions of the wheels is measured at all means, so in this case the velocity of the motor vehicle is related to the reference value. In dependence of load and angle of inclination, the reference value is set by the driver. With another embodiment a radio-transmitter arranged along the road gives the reference value for the control mechanism. Otherwise, this embodiment was developed for use in a broader circle, so e.g. it can be suitably used for controlling exhaust manifold, electric brakes /so-called Foucault brakes/.

In the British Patent GB-PS 2 057 611 a solution is discussed, which was developed also for vehicles with brake systems with locking-preventive means. Control for preventing locking affects also the hydrodynamic retarder, if it is switched-on by the driver. Reference value for the control, if speed is intended to be kept on a constant level, is to be regulated by the driver, in a given case continuously.

The control disclosed in the Patent GB-PS 1 382 439 seems to be the less dependent on the driver; in the basic position of the throttle pedal the hydrodynamic retarder is switched on. It is actuated with the brake pedal, and thus the hydrodynamic retarder gets actuated and the traditional brakes are operated with a delay only. In dependence of the efficiency of the hydrodynamic retarder or the running speed, adjustment must be carried out by the driver, or with another embodiment—theoretically—control may be performed by the slip of the two halves of the hydrodynamic torque converter.

From the solutions presented here it becomes obvious that up to now we could not speak about control with real possibilities of keeping the speed on a constant level. The vehicle reaches the pre-programmed reference value only at a predetermined angle of inclination or length of slope, below this level speed-keeping control does not exist. However, if regulation belongs to the tasks of the driver, it cannot be considered as an automatic speed-maintenance. If the hydrodynamic retarder is operated parallel with the traditional brake system, the latter one will be relieved only partly. At least, control may result in overcontrol, e.g. with the lastmentioned solution.

The aim of the invention is to provide for a hydrodynamic retarder brake, with which operation can be controlled so, that speed could be kept automatically on the desired level.

The aim set can be achieved so that in all cases ideal speed is selected as a reference speed. It is quite obvious that, while the driver treads on the gas, he considers the speed as proper, and it will keep proper even after having closed the throttle, if he does not begin to brake. In such a manner the speed can be considered as ideal, and taken as a reference speed, with which the vehicle travels in the moment when the driver closes the throttle. This value is to be rendered comparable for the control mechanism by storing it in a memory.

From a similar train of thoughts the conclusion can be drawn, in so far as the driver considers the speed prevailing in the moment of closing the throttle—either immediately or later—as an overspeed and intends to brake. He will stop braking when the speed has been reduced—according to his opinion—to a safe level. Furtheron this speed is to be considered as reference speed.

To be able to keep speed on the required level it seems to be expedient to eliminate the characteristic of the hydrodynamic retarder brake, in so far they become efficient rather slowly, as they are charged relatively slowly. This can be achieved so, if at the beginning of operation, by opening fully the controlling proportional valve, an unproportionally quick charging is obtained in comparison to the required braking, e.g. by using PD-regulation.

Accordingly, the invention relates to a process for the actuation of a hydrodynamic retarder brake controlled with an electrohydraulical valve-system for motor vehicles having a drive chain consisting of the internal combustion motor, the transmission driven through a clutch by said motor, at least one differential gear connected thereto directly or through a cardan shaft, a pair of differential shafts connected thereto, and a pair of wheels arranged thereon; the process according to the invention is realized such that, from the rpm.

of some structural part of the driving chain beginning with the driving shaft of the transmission and ending with the wheels, or from the average r.p.m. of a pair of structural parts, by using a signal transmitter measuring angular velocity, an electric signal of the angular velocity is generated continuously. Said signal is led to a memory and with the signal "basic gas" of a signal transmitter indicating the basic position of the throttle pedal, or by the instruction given with the braking brake signal of a transmitter indicating the different positions of the throttle pedal the signal of the momentary angular velocity is stored. With the signal "basic gas" or with the braking brake signal, a control signal is transmitted to the electrohydraulic valve system of the hydrodynamic retarder brake through a control unit; the signal of angular velocity is compared continuously with the signal of angular velocity stored in the memory. The difference between the two signals is used by a control unit to generate an output.

In a preferred version of the process according to the invention, the control unit generates a combined control signal, which is made up of two principal components: The first component is proportional to the difference between the momentary current and stored signals of angular velocity. The second component is proportional to the first differential of the first component and thus indicates the rate of change of the first component.

Figure 2:
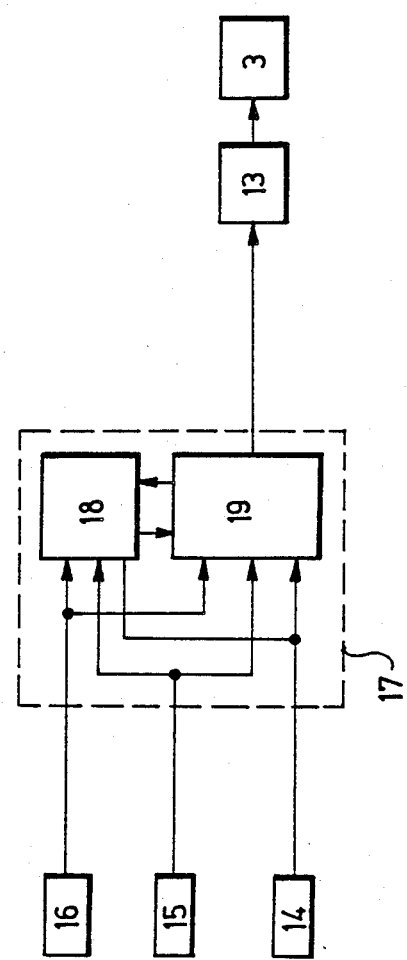
Figure 3:
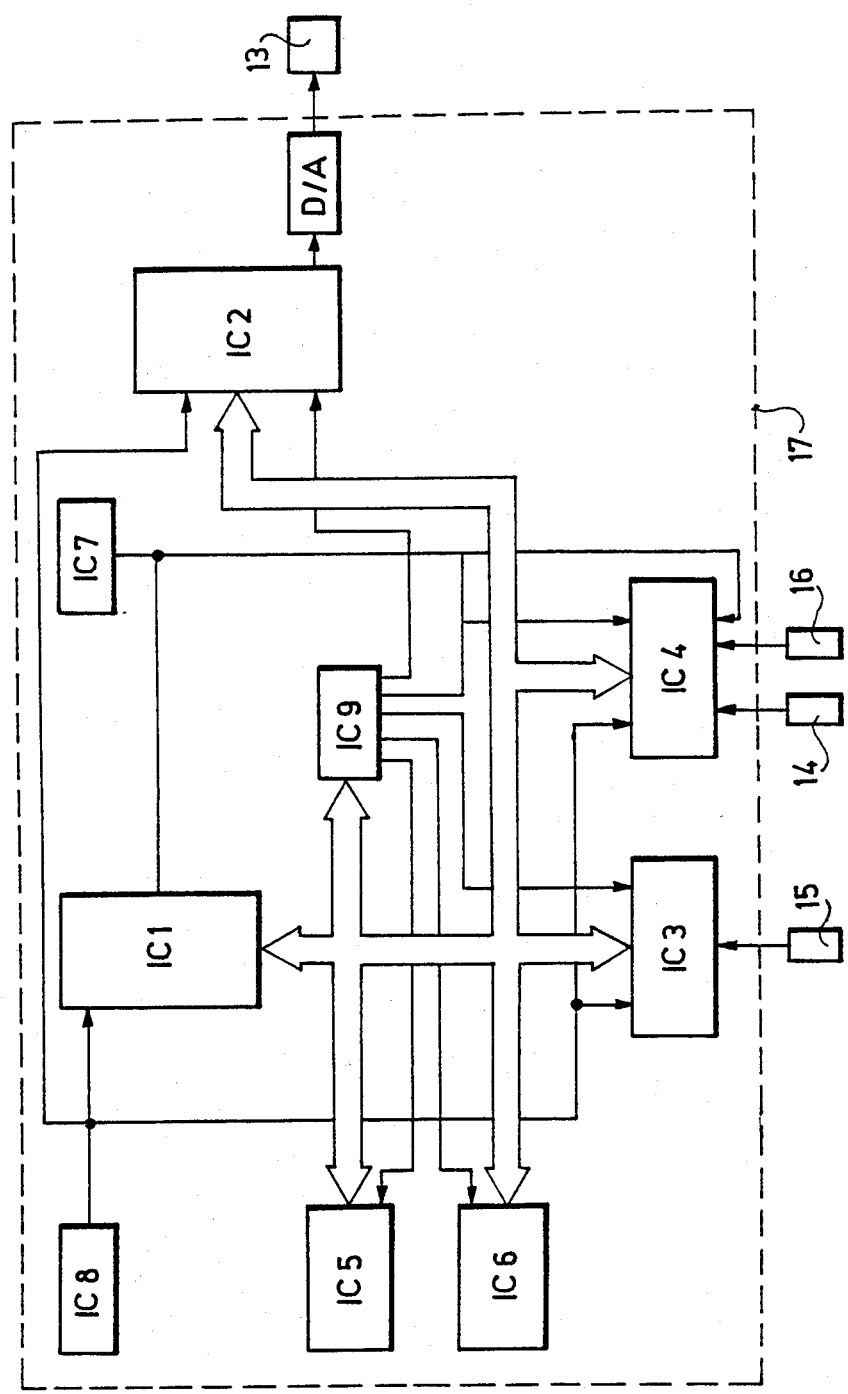

The invention will be described in detail by means of a preferred mode of realization without restricting the invention thereto, by the aid of the accompanying drawings, wherein:

FIG. 1 is the scheme of the driving system, brake system and gas charging system of the vehicle serving as example, FIG. 2 is the scheme of the control of the hydrodynamic retarder brake, FIG. 3 illustrates the scheme of the electronic unit partaking in control.

The apparatus according to the invention was prepared for the control of a retarder brake/hydrodynamic brake/ of an autobus travelling in city traffic.

As it is to be seen in FIG. 1 the bus driven by the motor 1, which is a six-cylinder internal combustion motor in Diesel-operation. The motor 1 is connected to the automatic transmission 2, which includes, in a way known in itself, a hydrodynamic torque converter and a friction clutch. A hydrodynamic retarder brake 3 is also built-in into the automatic transmission 2, together with the electromagnetic valves 13 and the proportional valve controlling the hydrodynamic retarder brake 3.

The output shaft of the automatic transmission 2 is connected to the differential gear 5 of the axle housing via the cardan shaft. The differential gear transmits the drive to the wheels 7 via the half-axles 6. These units for the drive chain of the bus.

For the sake of order it should be mentioned that the arrangement according to the invention can be well used for passanger cars. With a part of the passenger cars, namely with cars with frontal drive and rear-drive motors, the transmission and differential gear are united. Accordingly this drive chain does not include the cardan shaft.

FIG. 1 illustrates the brake system of the bus. This brake system consists of the brake valve actuated with the brake pedal 8, brake cylinders 9 actuating the brakes, and the interconnecting construction 10 transmitting the braking force, including the separately not indicated pipelines, valves, air receivers and the compressor supplying pressurized air.

As it becomes obvious from FIG. 1, the charging system 11 supplies fuel to the motor 1. This can be regulated with the throttle pedal 12.

Control of the hydrodynamic retarder brake requires basic informations, in a way, as shown in FIGS. 1 and 2, which are generated by means of proper signal transmitters.

One of the informations represents the momentary velocity of the vehicle, and the rate of change thereof. Even if the vehicle is provided with a brake system for the prevention of locking, the signal of the signal transmitter of the angular velocity measuring device arranged at the wheels, or the mean value thereof, complies with the requirements. With vehicles not provided with a brake system for the prevention of locking, the task can be solved even easier, as every transmission has a cyclometer connection, at which said signal can be taken. Accordingly, we provide the angular velocity signal transmitter 16 to the outdrive shaft of the automatic transmission 2.

A further information is given by the positions of the throttle pedal and the brake pedal expressing the intentions of the driver in connection with the velocity of the vehicle. For this purpose we provide a signal transmitter 14 indicating the different positions of the brake pedal and a signal transmitter 15 indicating the basic position of the throttle pedal.

All three signal transmitters are connected to the input of an electronic unit 17. Electronic unit 17 consists of the memory 18 and the control unit 19 connected thereto. Signal transmitters are connected also to the memory 18 and the control unit 19. Output of the control unit 19, which is an output section of the electronic unit 17, is connected to the corresponding electromagnets of the electromagnetic valves 13.

The electronic unit 17 can be built-up in several versions. A possible version is shown in FIG. 3. Electronic elements are indicated with the identifying markings of the IC-catalogue published by the Technical Publishers /Hungary/.

The electronic unit 17 illustrated in FIG. 3 consists of the IC1 microprocessor/Z80A/, the programmable IC2 input-output unit /8255/, the IC3 and IC4 three-channel programmable counting and timing unit /8253/ and the IC5 RAM unit /4016/, the IC6 ROM unit /2732/, the IC7 time-pulse generator /7434/, the IC8 reset unit /74 LS 132/, and the IC9 decoder unit /74 LS 183/, the D/A unit.

Address-data- and control connection points of the IC1 microprocessor, the IC2 programmable input-output unit, IC3 and IC4 three-channel programmable counter and timing unit, the IC5 RAM unit and IC6 ROM unit, as well as IC9 decoder unit, i.e., the points fulfilling identical functions, are interconnected.

The reset unit IC8 is connected to the "reset"-points of the IC1 microprocessor, the IC2 programmable input-output unit and the IC3 and IC4 three-channel programmable counter and timing unit.

Outputs of the IC9 decoder unit are connected individually with the chip select inputs of the IC2 programmable input-output unit, the IC3 ane IC4 three-channel programmable counter and timing unit, of the IC5 RAM unit and IC6 ROM unit.

IC7 time-pulse generator is connected to the time-pulse input of the IC1 microprocessor and the IC4 three-channel programmable counter and timing unit.

Output of the programmable IC2 input-output unit is connected to the inputs of the D/A converter.

When comparing FIG. 2 and 3, it becomes obvious that the two parts of the electronic unit 17, as separated functionally in FIG. 2, namely the actual components of the memory 18, control unit 19 and electronical unit 17 do not cover each other accurately in respect to connections. The explanation lies in that electronic control unit 17 can be built-up in a more simple way by using electronic elements specialized for the single tasks. Additionally, the electronic control unit 17 fulfils other tasks, too—not belonging to the scope of the invention—, such as control of the hydrodynamic retarder brake for the protection against locking, control of the automatic transmission, etc.

The electronic control unit 17 is connected to the signal transmitter 15 indicating the position of the throttle pedal through the input of the IC3 three-channel programmable counter and timing unit, while through the inputs of IC4 three-channel programmable counter and timing unit it is connected to the signal transmitter 14 indicating the position of the brake pedal and the signal transmitter 16 indicating angular velocity.

The output of the D/A converter is simultaneously the output of the electronic unit 17 and the electromagnetic valve 13 for the control of the hydrodynamic retarder brake 3. D/A converter generates a signal of the magnitude 0 to 10 V which is controlled, by the own control electronics of the proportional valve regulating the hydrodynamic retarder brake, to a voltage which regulates the proportional valve into the pressure range between 0 and 1 MPa.

The process according to the invention is realized in the following way:

As long as the bus travels so that the throttle pedal 12 is pressed by the driver, the hydrodynamic retarder brake 3 does not function at all. In this case the transmitter 16 for the signal of angular velocity signals continuously the velocity of the bus. However, the signal remains unprocessed in the electronic control unit 17.

Now, when the driver allows the throttle pedal 12 to return to its basic position, the signal transmitter 15, indicating the basic position of the throttle pedal causes the memory 18—in our case the IC5 RAM unit—to store the value of velocity, which was forwarded by the signal transmitter 16, as the signal of angular velocity.

Simultaneously the signal transmitter 15 gives a "basic gas" signal i.e. a command for the control unit 19 for the actuation of the hydrodynamic retarder brake 3. From this moment the control unit 19 compares continuously the velocity values stored in the memory 18 with the momentary velocity values transmitted continuously by the signal transmitter 16 as the signal of angular velocity. However, upon the "basic gas" signal of the signal transmitter, indicating the basic position of the throttle pedal, the control unit 19 does not give yet a control signal for the electromagnetic valve system 13.

If the bus is travelling on a slope, inspite of closing the throttle acceleration may occur. If this happens, the level of the angular velocity signal forwarded by the signal transmitter 16, i.e. the value of momentary velocity, will be higher than the stored value.

As soon as this happens, the control unit 19 forwards a control signal proportional with the difference to the electromagnetic valves 13. Thereafter the proportional valve actuates the hydrodynamic retarder brake to an extent which is needed to decelerate to the stored velocity value. This automatic control is continued as long as the control unit 19 concludes from the signal of the signal transmitter 16, indicating angular velocity, that without the actuation of the hydrodynamic retarder brake 3 the autobus would accelerate. That means that the control maintains the velocity.

If the driver finds that the velocity value stored is too high, he decelerates the vehicle by pressing the brake pedal 8 and brings the bus to the velocity considered as safe. The hydrodynamic retarder brake 3 partakes also in this action.

The transmitter 14 forwards a signal proportional with the position of the brake pedal 8 to the control unit 19, which again generates a signal proportional therewith and forwards it to the proportional valve of the electromagnetic valve 13. In such a manner the hydrodynamic retarder brake 3 exerts a brake effect proportional to the braking force of the brake cylinders 9.

Simultaneously the "braking" brake signal extinguishes the velocity value stored in the memory 18.

As soon as the autobus is decelerated the driver releases the brake pedal 8, and there is not a brake signal anymore. If the throttle pedal 12 is remains in its basic position, upon the signal of the signal transmitter 15 indicating the basic position of the throttle pedal the memory 18 again stores the signal of angular velocity which corresponds to the velocity measurable in the moment of releasing the brake pedal 8 by the signal transmitter 16 indicating angular velocity. In the next phase, the control unit 19 compares this signal with the signal of angular velocity corresponding to the momentary velocity. Control of the hydrodynamic retarder brake 3 in respect to the maintenance of velocity is the same, as described before.

Readiness for control of the control unit 19 can be terminated in the following manner:

Whe the driver intends to accelerate the autobus, he presses the throttle pedal 12. In such a manner the signal of the signal transmitter 15 indicating the basic position of the throttle pedal stops. As a consequence, the stored signal of angular velocity is extinguished in the memory 18. Simultaneously the control signal of the control unit 19 for the electromagnetic valves ceases, too.

It may also happen that the vehicle is permanently decelerated to the stored velocity value, this deceleration cannot be stopped by the control unit 19, even, if the hydrodynamic retarder brake is completely disconnected.

Now the control unit 19 cancels the signal stored in the memory 18.

In the following we give further two possible versions of realization. In consideration that the only difference is that fewer signal transmitters are used, the embodiment can be well understood on basis of the figures described in connection with the previous example.

With one version, the signal transmitter indicating the position of the brake pedal was omitted. In this case the process is modified, as follows:

Upon the signal "basic gas" of the signal transmitter 15 indicating the position of the throttle pedal, the memory 18 stores the signal of the transmitter 16 indicating the momentary value of angular velocity. Thereafter—as described before—the control unit 19 actuates the hydrodynamic retarder brake 3 and control for maintaining level of velocity begins.

If the driver intends to travel with a velocity being lower than the stored velocity value, he decelerates the autobus by actuating the brake pedal 8, thereafter he displaces the throttle pedal 12 from its basic position for a second and allows it back. In this case, by displacing the throttle pedal 12 the stored signal of angular velocity will be extinguished in the memory 18. Thereafter, by bringing into the basic position the proper signal of angular velocity—produced by deceleration—will be stored in the memory 18. Now the control unit 19 compares to this signal the signal of angular velocity corresponding to the momentary velocity.

Readyness for control of the control unit 19 and content of the memory are cancelled, as described before.

With the other version the signal transmitter indicating the position of the throttle pedal was omitted. The process takes place, as follows:

By the momentary actuating of the brake pedal 8 the driver gives the command for storing the angular velocity signal of the signal transmitter 16. Now the signal transmitter 14 indicating the position of the brake pedal forwards a signal to the memory 18 for storing a signal corresponding to the momentary angular velocity and a signal to the control unit 19 for the control of the hydrodynamic retarder brake 3 for keeping the level of velocity. Course of control corresponds to the previously described.

For the travel with keeping the velocity at a lower level the driver brakes the vehicle by actuating the brake pedal 8 in a known way. Simultaneously, velocity maintaining control of the hydrodynamic retarder brake is also stopped. Thereafter, by releasing and repeating actuation of the brake pedal 8 the driver starts the known process. That means that upon repeated actuation of the brake pedal 8, the signal transmitter 14 indicating the position of the brake pedal forwards a signal to the memory 18 for storing the signal of angular velocity corresponding to momentary velocity and a single to the control unit 19 for the control of the hydrodynamic retarder brake with maintaining the level of velocity. Now the brake pedal 8 can be released.

Another method for extinguishing the readyness for control of the control unit 19 and the memory 18 lies in the automatic disconnection due to overdeceleration. Another possibility lies in, if the driver intends to accelerate the vehicle, to put the system out of operation by the momentary actuation of the brake pedal 8.

As it becomes obvious from all what has been said, by using the solution according to the invention traditional brake system can be completely relieved in course of the control with maintaining velocity as long as the hydrodynamic retarder brake in itself suffices for efficient braking.

As already mentioned in our preamble, the conventional hydrodynamic retarder brake has the disadvantageous characteristic, in so far as it reacts slowly to the control signals. For a fully effective system for maintaining the level of velocity, immediate and sensitve reaction is indispensable. As a consequence, the program of the control unit 19 was prepared by using PD-control. In this case it means that control signal of the control unit 19 is composed of two parts. One part is proportional with the difference between the angular velocity stored in the memory 18 and the signal of angular velocity forwarded by the transmitter 16, while the other part is the first differential of said one part, which is superimposed onto the first part.

By the application of PD-control, the proportional valve controlling the hydrodynamic retarder brake is caused to open quickly upon receiving the signal of the control unit 19, and is thereafter set gradually to the essentially linear control.

At last we should like to remark that the control system is provided with a disconnecting means. Said means is not illustrated in the figures. As already mentioned before, our control unit fulfills other tasks, too, and manual actuating was co-ordinated therewith. In our case this fact is without importance, as automatic disconnection is assured in several ways. However, with control units designed in a different way one has to provide for the proper solution.

What we claim:

1. A method of actuation of a hydrodynamic retarder brake controlled by an electrohydraulic valve system for motor vehicles, provided with a drive chain, and brake and throttle controls, which comprises
    (a) generating an electrical signal representing the momentary velocity of the vehicle,
    (b) detecting the positions of the throttle and brake controls of the vehicle,
    (c) in response to one of (i) release of the throttle control or (ii) actuation of the brake control, causing a signal representing the momentary current vehicle velocity to be stored in a memory as a reference signal,
    (d) continually comparing a signal representing the momentary velocity of the vehicle to the stored velocity reference signal and, in response to the former exceeding the latter, actuating said hydrodynamic retarder.

2. The method of claim 1, further characterized by, while said retarder remains actuated and said throttle control continues to be released,
    (a) upon detection of actuation of the brake control, causing the velocity reference signal theretofore stored in said memory to be released, and
    (b) upon subsequent detection of release of said brake control, causing a new velocity reference signal to be stored in said memory corresponding to the momentary vehicle velocity at the moment of release.

3. The method of claim 1, further characterized by
    (a) said hydrodynamic retarder being controlled by a variably responsive electrohydraulic valve system,
    (b) providing to said electrohydraulic valve system a variable control signal comprising (i) a first component representing the momentary difference between momentary current vehicle velocity and the reference velocity represented by the signal stored in memory and (ii) a second component, superimposed upon said first component, representing the first differential quotient of said first component,
    (c) whereby the effect of said hydrodynamic retarder is varied as a function of the rate of change of said momentary difference.

* * * * *